United States Patent
Shi et al.

(10) Patent No.: US 9,923,759 B2
(45) Date of Patent: Mar. 20, 2018

(54) CONTROL METHOD AND DEVICE FOR SELF-LOOPBACK OF NETWORK DATA

(71) Applicant: ZTE Corporation, Shenzhen (CN)

(72) Inventors: Dajun Shi, Shenzhen (CN); Yuan Ma, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 62 days.

(21) Appl. No.: 15/022,332

(22) PCT Filed: May 22, 2014

(86) PCT No.: PCT/CN2014/078173
§ 371 (c)(1),
(2) Date: Mar. 16, 2016

(87) PCT Pub. No.: WO2015/039456
PCT Pub. Date: Mar. 26, 2015

(65) Prior Publication Data
US 2016/0234058 A1    Aug. 11, 2016

(30) Foreign Application Priority Data

Sep. 18, 2013  (CN) .......................... 2013 1 0431716

(51) Int. Cl.
*H04L 12/24*    (2006.01)
*H04L 12/64*    (2006.01)
(Continued)

(52) U.S. Cl.
CPC ...... *H04L 41/0654* (2013.01); *H04L 12/6418* (2013.01); *H04L 41/14* (2013.01);
(Continued)

(58) Field of Classification Search
None
See application file for complete search history.

(56) References Cited

U.S. PATENT DOCUMENTS

| | | | |
|---|---|---|---|
| 9,319,304 B2* | 4/2016 | Zhang | H04L 45/22 |
| 2002/0004843 A1* | 1/2002 | Andersson | H04L 45/00 |
| | | | 709/238 |

(Continued)

FOREIGN PATENT DOCUMENTS

| | | |
|---|---|---|
| CN | 101588304 A | 11/2009 |
| CN | 102142975 A | 8/2011 |

(Continued)

OTHER PUBLICATIONS

International Search Report in international application No. PCT/CN2014/078173, dated Aug. 25, 2014.

(Continued)

*Primary Examiner* — Anh Ngoc Nguyen
(74) *Attorney, Agent, or Firm* — Oppedahl Patent Law Firm LLC (57) ABSTRACT

A method and device for controlling self-loopback of network data are provided. The method includes that: whether a master forwarding link and standby forwarding link of a master node in a network structure both fail or not is determined; and when the master forwarding link and the standby forwarding link of the master node both fail, a forwarding attribute of a standby egress port in a data packet forwarding table of the master node is modified into forwarding through the master forwarding link of the master node.

18 Claims, 3 Drawing Sheets

(51) Int. Cl.
*H04L 12/707* (2013.01)
*H04L 12/703* (2013.01)
*H04L 12/741* (2013.01)
*H04L 12/721* (2013.01)

(52) U.S. Cl.
CPC .............. *H04L 45/22* (2013.01); *H04L 45/28* (2013.01); *H04L 45/745* (2013.01); *H04L 45/68* (2013.01)

(56) References Cited

U.S. PATENT DOCUMENTS

| | | | |
|---|---|---|---|
| 2004/0090913 A1* | 5/2004 | Scudder | H04L 45/02 370/219 |
| 2008/0130491 A1 | 6/2008 | Chao | |
| 2008/0151882 A1 | 6/2008 | Sanjay | |
| 2009/0190478 A1 | 7/2009 | Li | |
| 2009/0296568 A1 | 12/2009 | Kitada | |
| 2011/0038251 A1 | 2/2011 | Li | |
| 2014/0185430 A1 | 7/2014 | Li et al. | |
| 2014/0185432 A1* | 7/2014 | Liu | H04L 41/0668 370/228 |
| 2015/0207673 A1* | 7/2015 | Cui | H04L 12/2863 370/228 |

FOREIGN PATENT DOCUMENTS

| | | |
|---|---|---|
| CN | 102664788 A | 9/2012 |
| CN | 103259678 A | 8/2013 |

OTHER PUBLICATIONS

English Translation of the Written Opinion of the International Search Authority in international application No. PCT/CN2014/078173, dated Aug. 25, 2014.

Supplementary European Search Report in European application No. 14845059.6, dated Aug. 18, 2016.

\* cited by examiner

CONTROL METHOD AND DEVICE FOR SELF-LOOPBACK OF NETWORK DATA

TECHNICAL FIELD

The present disclosure relates to a Packet Transport Network (PTN), and in particular to a method and device for controlling self-loopback of network data.

BACKGROUND

In a PTN, protection on a user side and that on a network side are interlinked, and an Operation Administration and Maintenance-Mapping (OAM-Mapping) function is deployed on a user Attachment Circuit (AC) side to implement switching on the network side together in case of a failure on the user side. In order to isolate a user side failure from a network side failure, that is, when a user AC side fails, protection switching is only performed on the user side, and protection switching is not performed on the network side, so that influence on a service of the network side is further avoided. A manner adopted in a conventional art is implemented by a three-point bridge scenario deployed with a network side protection Multi-Chassis Pseudo Wire (MC-PW) and a user side Multi-Chassis Link Aggregation Group (MC-LAG) Dual Node Interconnection (DNI) Pseudo Wire (PW), that is, when a master service PW link fails, data on the network side is sent to an egress port of a master AC through a standby node, the DNI PW and a master node for continuous forwarding; and when the master AC fails, the data on the network side is sent to an egress port of a standby AC through the master node, the DNI PW and the standby node for continuous forwarding, so that the failure on the user side and the failure on the network side are separately protected without mutual interference.

However, when the master and standby ACs fail, the data on the network side which is forwarded by a head node Provider Edge (PE) is sent back to the head node PE through the master node, the DNI PW and the standby node, and when a double-receiving mode is configured for the head node, the self receiving and self sending of a data packet under a network structure occur, which may waste data traffic under the network structure.

SUMMARY

In order to solve the existing technical problem, the embodiments of the present disclosure provide a method and device for controlling self-loopback of network data.

An embodiment of the present disclosure provides a method for controlling self-loopback of network data, which may include that:

whether a master forwarding link and a standby forwarding link of a master node in a network structure both fail or not is determined; and when the master forwarding link and the standby forwarding link of the master node both fail, a forwarding attribute of a standby egress port in a data packet forwarding table of the master node is modified into forwarding through the master forwarding link of the master node.

Preferably, after the step that the forwarding attribute of the standby egress port in the data packet forwarding table of the master node is modified into forwarding through the master forwarding link of the master node, the method may further include that:

whether a standby node receives a data packet from the master node or not is determined; and when the standby node receives the data packet from the master node, the data packet forwarding table of the master node is modified to ensure that the forwarding attribute of the standby egress port in the data packet forwarding table of the master node is modified into forwarding through the master forwarding link of the master node.

Preferably, the method may further include that:

information of the master node of which the master forwarding link and standby forwarding link both fail is acquired, and whether communication of the standby forwarding link of the acquired master node is resumed or not is determined within a preset time; and when communication of the standby forwarding link of the acquired master node is resumed, the forwarding attribute of the standby egress port in the data packet forwarding table is modified back into forwarding through the standby forwarding link.

Preferably, after the step that whether the master forwarding link and standby forwarding link of the master node in the network structure both fail or not is determined, the method may further include that:

when the master forwarding link of the master node fails and the standby forwarding link of the master node does not fail, the master node is controlled to send a received data packet to a corresponding standby node through a preset protection link to enable the corresponding standby node to forward the received data packet.

Preferably, the step that whether the master forwarding link and standby forwarding link of the master node both fail or not is determined may further include that:

failure information sent by the master forwarding link and/or the standby forwarding link of the master node is detected and received, and when the failure information sent by the master forwarding link and the standby forwarding link of the master node is received within a preset time, it is determined that the master forwarding link and the standby forwarding link of the master node both fail.

An embodiment of the present disclosure further provides a device for controlling self-loopback of network data, which may include:

an analysis module, configured to determine whether a master forwarding link and a standby forwarding link of a master node in a network structure both fail or not; and a processing module, configured to, when the master forwarding link and the standby forwarding link of the master node both fail, modify a forwarding attribute of a standby egress port in a data packet forwarding table of the master node into forwarding through the master forwarding link of the master node.

Preferably, the analysis module may further be configured to determine whether a standby node receives a data packet from the master node or not; and the processing module may further be configured to, when the standby node receives the data packet from the master node, modify the data packet forwarding table of the master node to ensure that the forwarding attribute of the standby egress port in the data packet forwarding table of the master node is modified into forwarding through the master forwarding link of the master node.

Preferably, the processing module may further be configured to acquire information of the master node of which the master forwarding link and the standby forwarding link both fail;

the analysis module may further be configured to determine within a preset time whether communication of the standby forwarding link of the acquired master node is resumed or not; and the processing module may further be configured to, when communication of the standby forwarding link of the acquired master node is resumed, modify the forwarding attribute of the standby egress port in the data packet forwarding table back into forwarding through the standby forwarding link.

Preferably, the processing module may further be configured to, when the master forwarding link of the master node fails and the standby forwarding link of the master node does not fail, control the master node to send a received data packet to a corresponding standby node through a preset protection link to enable the corresponding standby node to forward the received data packet.

Preferably, the device may further include a data receiving and sending module, wherein the data receiving and sending module may be configured to detect and receive failure information from the master forwarding link and/or the standby forwarding link of the master node; and the analysis module may further be configured to, when the failure information sent by the master forwarding link and the standby forwarding link of the master node is received within a preset time, determine that the master forwarding link and the standby forwarding link of the master node both fail.

An embodiment of the present disclosure further provides a computer-readable storage medium, which may include a set of computer-executable instructions, the instructions being configured to execute the method for controlling self-loopback of network data according to the embodiment of the present disclosure.

According to the embodiments of the present disclosure, when master and standby forwarding links of a master node fail, a forwarding attribute of a standby egress port in a data packet forwarding table of the master node is modified into forwarding through the master forwarding link of the master node, so that the self sending and self receiving of a data packet in a network structure are effectively avoided, waste of data traffic in the network structure is reduced, and a utilization rate of the data traffic is increased.

DETAILED DESCRIPTION

It should be understood that specific embodiments described here are only adopted to explain the present disclosure and not intended to limit the present disclosure.

Figure 1:
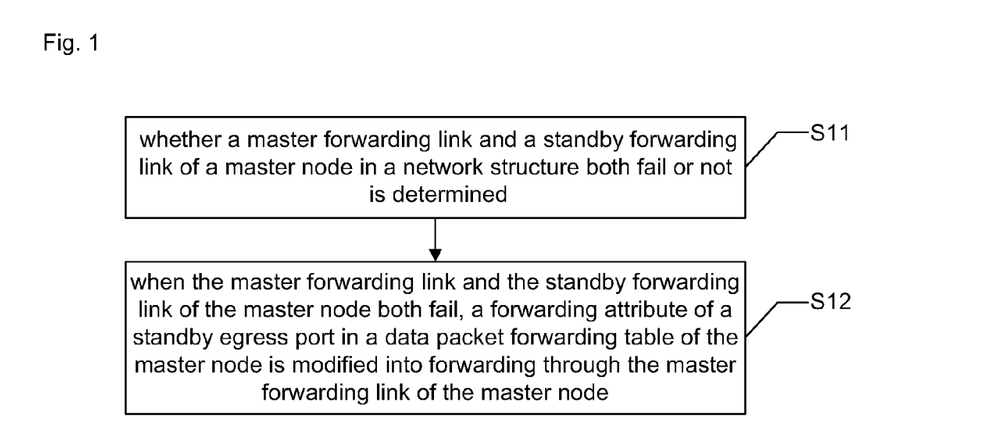
FIG. 1 is a specific flowchart of a first embodiment of a method for controlling self-loopback of network data according to the present disclosure.
Figure 2:
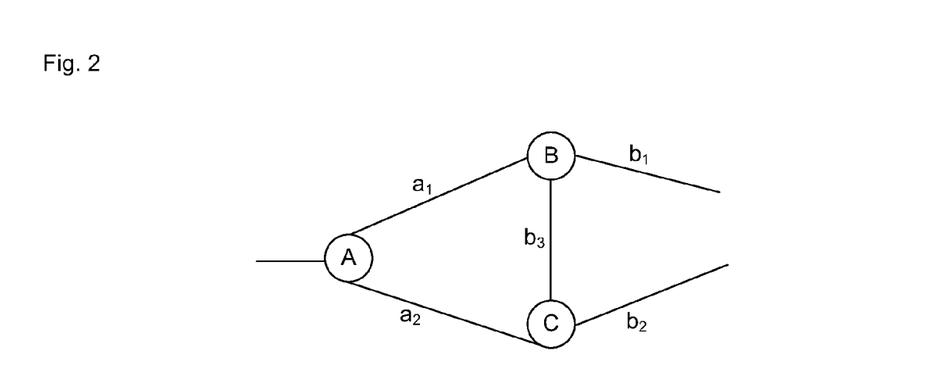
FIG. 2 is a schematic diagram of a network structure during control of self-loopback of network data according to an embodiment of the present disclosure.

As shown in FIG. 1 and FIG. 2, FIG. 1 is a specific flowchart of a first embodiment of a method for controlling self-loopback of network data according to the present disclosure, and FIG. 2 is a diagram of a network structure during control of self-loopback of network data according to an embodiment of the present disclosure.

It is needed to emphasize that: the flowchart shown in FIG. 1 is only a preferred embodiment, and those skilled in the art should know that any embodiment constructed based on a thought of the present disclosure should not be departed from a scope covered by the following technical solutions, including that:

whether a master forwarding link and a standby forwarding link of a master node in a network structure both fail or not is determined; and when the master forwarding link and the standby forwarding link of the master node both fail, a forwarding attribute of a standby egress port in a data packet forwarding table of the master node is modified into forwarding through the master forwarding link of the master node.

In the embodiment, control over self-loopback of network data is gradually implemented by the following specific steps:

Step S11: whether a master forwarding link and a standby forwarding link of a master node in a network structure both fail or not is determined.

Specifically, nodes, including master nodes and standby nodes, are arranged in the network structure according to a network data forwarding requirement, each master node is configured with standby nodes, master egress ports and standby egress ports are configured for the master nodes, forwarding links are also configured for each master node; the forwarding links include master forwarding links and standby forwarding links, the master egress ports of the master nodes correspond to the master forwarding links, and the standby egress ports correspond to the standby forwarding links; and a master and standby relationship is set for each node in the network structure, and protection links are arranged between the master nodes and the standby nodes, so that received data packets may be sent to the standby nodes through the protection links when the forwarding links of the master nodes fail, and then the data packets are forwarded through the standby nodes. When the master nodes receive the data packets, whether the forwarding links of the master nodes fail or not may also be determined periodically or in real time, that is, whether the master forwarding links and the standby forwarding links of the master nodes fail or not may be determined. A manner of determining whether the forwarding links of the master nodes fail or not may be that any node arranged in the network structure determines whether the forwarding links of the master nodes fail or not, may also be that control equipment arranged in the network structure determines whether the forwarding links of the master nodes fail or not, and may also be that control equipment or a server in communication connection with each node in the network structure and outside the network structure determines whether the forwarding links of the master nodes fail or not, and there are no limits made herein. Referring to FIG. 2, the network structure includes a head node A, which may also be considered as a master node A, a master forwarding link $a_1$ of the head node A, a standby forwarding link $a_2$ of the head node A, a master node B, a standby node C and a master forwarding link $b_1$, standby forwarding link $b_2$ and protection link $b_3$ of the master node B; when the head node A sends a data packet to the master node B through the master forwarding link $a_1$ of the head node A and the master node B receives the data packet sent by the head node A, whether the forwarding links of the master node B fail or not is determined, that is, whether the forwarding links $b_1$ and $b_2$ fail or not is determined, to analyze whether the master node B may normally forward the received data packet according to the preset network structure or not; a manner of determining whether the master forwarding link and the standby forwarding link of the master node fail or not is to detect and receive failure information sent by the master forwarding link and/or the standby forwarding link of the master node and determine that the master forwarding link and standby forwarding link of the master node both fail when the failure information sent by the master forwarding link and standby forwarding link of the master node is received within a preset time; and the preset time may be 1 ms, 2 ms or any other appropriate time which is set by a user in advance.

Step S12: when the master forwarding link and the standby forwarding link of the master node both fail, a forwarding attribute of a standby egress port in a data packet forwarding table of the master node is modified into forwarding through the master forwarding link of the master node.

Specifically, when the master forwarding link and the standby forwarding link both fail, the data packet forwarding table of the master node is determined, the master node sends a received data packet to a standby node according to the determined data packet forwarding table of the master node, and since the standby forwarding link fails, the standby node may not forward the data packet through the standby forwarding link, and the standby node sends the data packet received from the master node back to a previous node sending the data packet to the master node. Referring to FIG. 2, the network structure includes the head node A, the master forwarding link $a_1$ of the head node A, the standby forwarding link $a_2$ of the head node A, the master node B, the standby node C and the master forwarding link $b_1$, standby forwarding link $b_2$ and protection link $b_3$ of the master node B; and the master node B sends the received data packet to the standby node C through the protection link $b_3$, and since the standby forwarding link $b_2$ of the master node B fails, the standby node C sends the data packet back to the head node A through the standby forwarding link $a_2$ of the head node A to implement self-loopback of the data packet.

The forwarding attribute of the standby egress port in the data packet forwarding table of the master node is forwarding through the master forwarding link of the master node. Referring to FIG. 2, the network structure includes the head node A, the master forwarding link $a_1$ of the head node A, the standby forwarding link $a_2$ of the head node A, the master node B, the standby node C and the master forwarding link $b_1$, standby forwarding link $b_2$ and protection link $b_3$ of the master node B, wherein the master forwarding link $b_1$ of the master node B is a master port of the master node, and the protection link $b_3$ of the master node B is a standby port of the master node; a data packet forwarding table of the master node B is determined, and a forwarding attribute of a standby egress port in the data packet forwarding table of the master node B is modified into forwarding through the master forwarding link of the master node, that is, the standby egress port in the data packet forwarding table of the master node B is modified from forwarding through the protection link $b_3$ into forwarding through the master forwarding link $b_1$, so that the master node B forwards the received data packet through the master forwarding link $b_1$ of the master node B; however, the master forwarding link $b_1$ of the master node B fails, and the data packet is interrupted, thereby avoiding the situation that the data packet is sent to the standby node C through the protection link $b_3$ and the standby node C sends the data packet back to the head node A through the standby forwarding link $a_2$ of the head node A to cause self-loopback of the network data packet since the standby forwarding link $b_2$ of the master node B fails.

When the master and standby forwarding links of the master node fail, the forwarding attribute of the standby egress port in the data packet forwarding table of the master node is modified into forwarding through the master forwarding link of the master node, so that the self sending and self receiving of the data packet in the network structure are effectively avoided, waste of data traffic in the network structure is reduced, and a utilization rate of the data traffic is increased.

Figure 3:
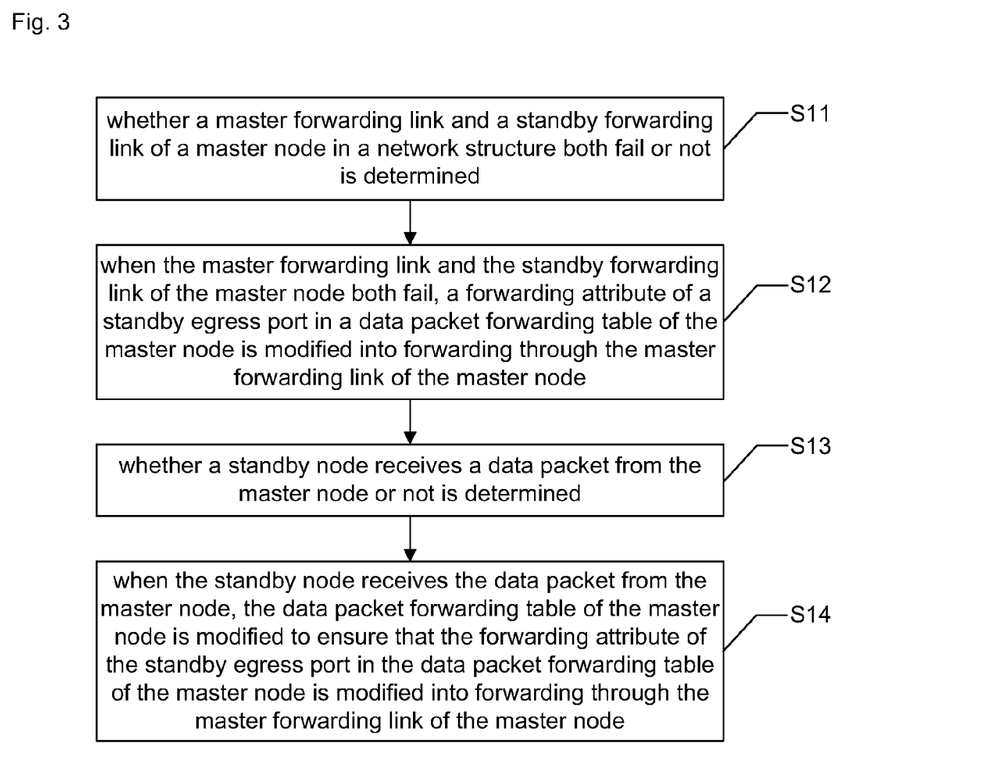
FIG. 3 is a specific flowchart of a second embodiment of a method for controlling self-loopback of network data according to the present disclosure.

FIG. 3 is a specific flowchart of a second embodiment of a method for controlling self-loopback of network data according to the present disclosure.

Based on the abovementioned first embodiment, after Step S12, the method further includes:

Step S13: whether a standby node receives a data packet from the master node or not is determined; and Step S14: when the standby node receives the data packet from the master node, the data packet forwarding table of the master node is modified to ensure that the forwarding attribute of the standby egress port in the data packet forwarding table of the master node is modified into forwarding through the master forwarding link of the master node.

Specifically, whether the standby node receives the data packet from the master node or not is determined, that is, whether the forwarding attribute of the standby egress port of the master node in the data packet forwarding table of the master node is successfully modified into forwarding through the master forwarding link of the master node or not is determined, and when the standby egress port of the master node is not successfully modified from forwarding through the standby forwarding link into forwarding through the master forwarding link of the master node, the master node sends the data packet to the standby node. When the standby node receives the data packet from the master node, that is, when it is determined that the forwarding attribute of the standby egress port of the master node is not successfully modified into forwarding through the master forwarding link of the master node, the data packet forwarding table of the master node is modified to ensure that the forwarding attribute of the standby egress port of the master node is modified into forwarding through the master forwarding link of the master node.

After the forwarding attribute of the standby egress port of the master node in the forwarding table of the master node is modified, whether the standby node receives the data packet sent by the master node or not is analyzed, and when the standby node receives the data packet sent by the master node, the data packet forwarding table of the master node is modified again to ensure that the forwarding attribute of the standby egress port of the master node is modified into forwarding through the master forwarding link of the master node to enable the master node to directly forward the received data packet through the master forwarding link of the master node, so that self-loopback of the data packet in the network structure is prevented, waste of the data traffic in the network structure is reduced, and the utilization rate of the data traffic is increased.

Figure 4:
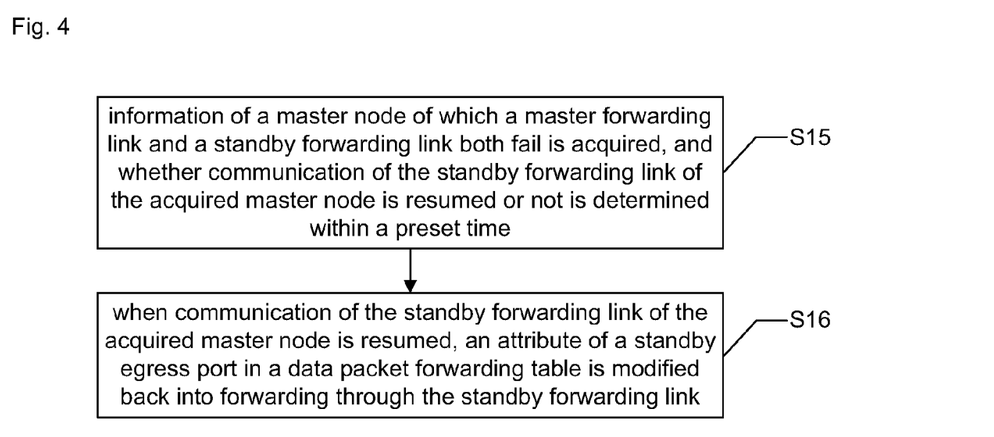
FIG. 4 is a specific flowchart of a third embodiment of a method for controlling self-loopback of network data according to the present disclosure.

FIG. 4 is a specific flowchart of a third embodiment of a method for controlling self-loopback of network data according to the present disclosure.

Based on the abovementioned first embodiment, the method further includes:

Step S15: information of the master node of which the master forwarding link and the standby forwarding link both fail is acquired, and whether communication of the standby forwarding link of the acquired master node is resumed or not is determined within a preset time; and Step S16: when communication of the standby forwarding link of the acquired master node is resumed, the attribute of the standby egress port in the data packet forwarding table is modified back into forwarding through the standby forwarding link.

Specifically, after the forwarding attribute of the standby egress port in the data packet forwarding table of the master node is modified into forwarding through the master forwarding link, the information of the master node of which the master forwarding link and standby forwarding link both fail is acquired, that is, the number of master nodes of which the master forwarding links and standby forwarding links both fail in the network structure and identification information of each master node of which the master forwarding links and standby forwarding links both fail are acquired, and the identification information may be any information suitable for uniquely identifying the master node, such as a serial number of the master node in the network structure or a physical address or Internet Protocol (IP) address of the master node. The operation that whether communication of the standby forwarding link of the acquired master node is resumed or not is determined within a preset time may be that any node arranged in the network structure determines whether communication of the standby forwarding link of the acquired master node is resumed or not, may also be that control equipment arranged in the network structure determines whether communication of the standby forwarding link of the acquired master node is resumed or not, and may also be that control equipment or a server in communication connection with each node in the network structure and outside the network structure determines whether communication of the standby forwarding link of the acquired master node is resumed or not, and there are no limits made herein. The preset time may be 3 minutes or 10 minutes, or may also be any other time period which is set in advance. When communication of the standby forwarding link of the acquired master node is resumed, the attribute of the standby egress port in the data packet forwarding table is modified back into forwarding through the standby forwarding link.

Whether communication of the standby forwarding link of the node of which the master forwarding link and the standby forwarding link both fail is resumed or not is determined within the preset time, and the attribute of the standby egress port in the data packet forwarding table of the node is timely modified back into forwarding through the standby forwarding link to enable the node to forward the received data packet through the standby forwarding link when communication of the master forwarding link of the node is not resumed, so that smooth communication under the network structure and timely forwarding of the data packet are ensured.

Figure 5:
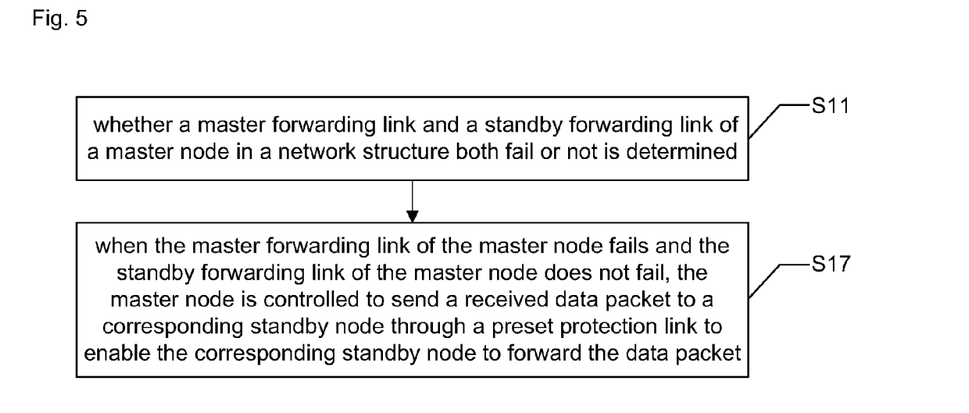
FIG. 5 is a specific flowchart of a fourth embodiment of a method for controlling self-loopback of network data according to the present disclosure.

As shown in FIG. 2 and FIG. 5, FIG. 2 is a schematic diagram of a network structure during control of self-loopback of network data according to the present disclosure, and FIG. 5 is a specific flowchart of a fourth embodiment of a method for controlling self-loopback of network data according to the present disclosure.

Based on the abovementioned first embodiment, after Step 11, the method further includes:

Step S17: when the master forwarding link of the master node fails and the standby forwarding link of the master node does not fail, the master node is controlled to send the received data packet to a corresponding standby node through a preset protection link to enable the corresponding standby node to forward the data packet.

Specifically, when the master forwarding link of the master node fails and the standby forwarding link of the master node does not fail, the master node is controlled to send the received data packet to a corresponding standby node through the preset protection link to enable the corresponding standby node to forward the data packet. Referring to FIG. 2, the network structure includes the head node A, the master forwarding link $a_1$ of the head node A, the standby forwarding link $a_2$ of the head node A, the master node B, the standby node C and the master forwarding link $b_1$, standby forwarding link $b_2$ and protection link $b_3$ of the master node B; and when the master forwarding link $b_1$ of the master node B fails, the master node B sends the data packet received from the head node A to the standby node C through the protection link $b_3$ to enable the standby node C to forward the data packet through the standby forwarding link $b_2$.

When the master forwarding link of the master node fails, the master node is controlled to send the received data packet to the standby node through the protection link to enable the standby node to forward the data packet through the standby forwarding link, so that the received data packet may be forwarded even when the master forwarding link of the master node fails, and network reliability is thus improved.

Figure 6:
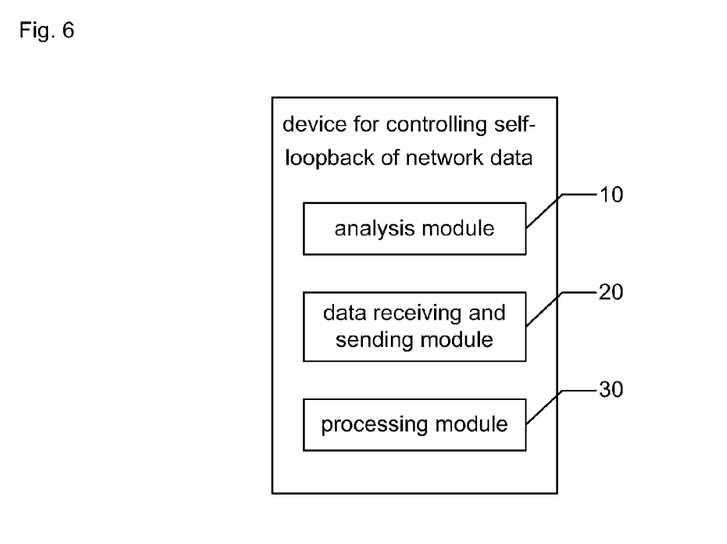
FIG. 6 is a specific flowchart of a preferred embodiment of a device for controlling self-loopback of network data according to the present disclosure.

As shown in FIG. 2 and FIG. 6, FIG. 2 is a diagram of a network structure during control of self-loopback of network data according to the present disclosure, and FIG. 6 is a specific flowchart of a preferred embodiment of a device for controlling self-loopback of network data according to the present disclosure. The device includes an analysis module 10, a data receiving and sending module 20 and a processing module 30, wherein the analysis module 10 is configured to determine whether a master forwarding link and a standby forwarding link of a master node in a network structure both fail or not.

Specifically, nodes, including master nodes and standby nodes, are arranged in the network structure according to a network data forwarding requirement, each master node is configured with standby nodes, master egress ports and standby egress ports are configured for the master nodes, forwarding links are also configured for each master node, the forwarding links include master forwarding links and standby forwarding links, the master egress ports of the master nodes correspond to the master forwarding links, and the standby egress ports correspond to the standby forwarding links; and a master and standby relationship is set for each node in the network structure, and protection links are arranged between the master nodes and the standby nodes, so that received data packets may be sent to the standby nodes through the protection links when the forwarding links of the master nodes fail, and then the data packets are forwarded through the standby nodes. When the master nodes receive the data packets, the analysis module 10 may also determine whether the forwarding links of the master nodes fail or not periodically or in real time, namely determines whether the master forwarding links and standby forwarding links of the master nodes fail or not. Referring to FIG. 2, the network structure includes a head node A, which may also be considered as a master node A, a master forwarding link $a_1$ of the head node A, a standby forwarding link $a_2$ of the head node A, a master node B, a standby node C and a master forwarding link $b_1$, standby forwarding link $b_2$ and protection link $b_3$ of the master node B; when the head node A sends a data packet to the master node B through the master forwarding link $a_1$ of A and the master node B receives the data packet from the head node A, the analysis module 10 determines whether the forwarding links of the master node B fail or not, namely determines whether the forwarding links $b_1$ and $b_2$ fail or not, to analyze whether the master node B may normally forward the received data packet according to the preset network structure or not; a manner for the analysis module 10 to determine whether the master forwarding link and the standby forwarding link of the master node fail or not is to determine whether the data receiving and sending module 20 detects and receives failure information from the master forwarding link and/or standby forwarding link of the master node or not, and when the failure information sent by the master forwarding link and standby forwarding link of the master node is received within a preset time, the analysis module 10 determines that the master forwarding link and the standby forwarding link of the master node both fail; and the preset time may be 1 ms, 2 ms or any other appropriate time which is set by a user in advance.

The processing module 30 is configured to, when the master forwarding link and the standby forwarding link of the master node both fail, modify a forwarding attribute of a standby egress port in a data packet forwarding table of the master node into forwarding through the master forwarding link of the master node.

Specifically, when the master forwarding link and the standby forwarding link both fail, the processing module 30 determines the data packet forwarding table of the master node, the master node sends a received data packet to a standby node according to the determined data packet forwarding table of the master node; since the standby forwarding link fails, the standby node may not forward the data packet through the standby forwarding link, and the standby node sends the data packet received from the master node back to a previous node sending the data packet to the master node. Referring to FIG. 2, the network structure includes the head node A, the master forwarding link $a_1$ of the head node A, the standby forwarding link $a_2$ of the head node A, the master node B, the standby node C and the master forwarding link $b_1$, standby forwarding link $b_2$ and protection link $b_3$ of the master node B; and the master node B sends the received data packet to the standby node C through the protection link $b_3$, and since the standby forwarding link $b_2$ of the master node B fails, the standby node C sends the data packet back to the head node A through the standby forwarding link $a_2$ of the head node A to implement self-loopback of the data packet.

Preferably, the processing module 30 modifies the forwarding attribute of the standby egress port in the data packet forwarding table of the master node into forwarding through the master forwarding link of the master node. Referring to FIG. 2, the network structure includes the head node A, the master forwarding link $a_1$ of the head node A, the standby forwarding link $a_2$ of the head node A, the master node B, the standby node C and the master forwarding link $b_1$, standby forwarding link $b_2$ and protection link $b_3$ of the master node B, wherein the master forwarding link $b_1$ of the master node B is a master port of the master node, and the protection link $b_3$ of the master node B is a standby port of the master node; the processing module 30 determines a data packet forwarding table of the master node B, and modifies a forwarding attribute of a standby egress port in the data packet forwarding table of the master node B into forwarding through the master forwarding link of the master node, namely modifies the protection link $b_3$ of the standby egress port in the data packet forwarding table of the master node B into the master forwarding link $b_1$ of a master egress port of the master node, so that the master node B forwards the received data packet through the master forwarding link $b_1$ of the master node B; however, the master forwarding link $b_1$ of the master node B fails, and the data packet is interrupted, thereby avoiding the situation that the data packet is sent to the standby node C through the protection link $b_3$ and the standby node C sends the data packet back to the head node A through the standby forwarding link $a_2$ of the head node A to cause self-loopback of the network data packet since the standby forwarding link $b_2$ of the master node B fails.

When the master and standby forwarding links of the master node fail, the processing module 30 modifies the forwarding attribute of the standby egress port in the data packet forwarding table of the master node into forwarding through the master forwarding link of the master node, so that the self sending and self receiving of the data packet in the network structure are effectively avoided, waste of data traffic in the network structure is reduced, and a utilization rate of the data traffic is increased.

Preferably, the analysis module 10 is further configured to determine whether a standby node receives a data packet from the master node or not; and the processing module 30 is further configured to, when the standby node receives the data packet from the master node, modify the data packet forwarding table of the master node to ensure that the forwarding attribute of the standby egress port in the data packet forwarding table of the master node is modified into forwarding through the master forwarding link of the master node.

Specifically, the analysis module 10 determines whether the standby node receives the data packet sent by the master node or not, namely determines whether the forwarding attribute of the standby egress port of the master node in the data packet forwarding table of the master node is successfully modified into forwarding through the master forwarding link of the master node or not, and when the forwarding attribute of the standby egress port of the master node is not successfully modified into forwarding through the master forwarding link of the master node, the master node sends the data packet to the standby node. When the standby node receives the data packet from the master node, that is, when the analysis module 10 determines that the forwarding attribute of the standby egress port of the master node is not successfully modified into forwarding through the master forwarding link of the master node, the processing module 30 modifies the data packet forwarding table of the master node to ensure that the forwarding attribute of the standby egress port of the master node is modified into forwarding through the master forwarding link of the master node.

After the processing module 30 modifies the standby egress port of the master node in the forwarding table of the master node, the analysis module 10 analyzes whether the standby node receives the data packet sent by the master node or not, and when the standby node receives the data packet sent by the master node, the processing module 30 modifies the data packet forwarding table of the master node again to ensure that the forwarding attribute of the standby egress port of the master node is modified into forwarding through the master forwarding link of the master node to enable the master node to directly forward the received data packet through the master forwarding link of the master node, so that self-loopback of the data packet in the network structure is prevented, waste of the data traffic in the network structure is reduced, and the utilization rate of the data traffic is increased.

Preferably, the processing module 30 is further configured to acquire information of the master node of which the master forwarding link and the standby forwarding link both fail;

the analysis module 10 is further configured to determine whether communication of the standby forwarding link of the acquired master node is resumed or not within a preset time; and the processing module 30 is further configured to, when communication of the standby forwarding link of the acquired master node is resumed, modify the attribute of the standby egress port in the data packet forwarding table back into forwarding through the standby forwarding link.

Specifically, after the forwarding attribute of the standby egress port in the data packet forwarding table of the master node is modified into forwarding through the master forwarding link, the processing module 30 acquires the information of the master node of which the master forwarding link and the standby forwarding link both fail, namely acquires the number of master nodes of which the master forwarding links and standby forwarding links both fail in the network structure and identification information of each master node of which the master forwarding links and standby forwarding links both fail, and the identification information may be any information suitable for uniquely identifying the master node, such as a serial number of the master node in the network structure or a physical address or IP address of the master node. The analysis module 10 determines whether communication of the standby forwarding link of the acquired master node is resumed or not within the preset time. The preset time may be 3 minutes or 10 minutes, or may also be any other time period set in advance. When communication of the standby forwarding link of the acquired master node is resumed, the processing module 30 modifies the attribute of the standby egress port in the data packet forwarding table back into forwarding through the standby forwarding link.

The analysis module 10 determines within the preset time whether communication of the standby forwarding link of the node of which the master forwarding link and the standby forwarding link both fail is resumed or not, and the processing module 30 timely modifies the attribute of the standby egress port in the data packet forwarding table of the node back into forwarding through the standby forwarding link to enable the node to forward the received data packet through the standby forwarding link when communication of the master forwarding link of the node is not resumed, so that smooth communication of the network structure and timely forwarding of the data packet are ensured.

Preferably, the processing module 30 is further configured to, when the master forwarding link of the master node fails and the standby forwarding link of the master node does not fail, control the master node to send the received data packet to the corresponding standby node through a preset protection link to enable the corresponding standby node to forward the data packet.

Specifically, when the master forwarding link of the master node fails and the standby forwarding link of the master node does not fail, the processing module 30 controls the master node to send the received data packet to a corresponding standby node through the preset protection link to enable the corresponding standby node to forward the data packet. Referring to FIG. 2, the network structure includes the head node A, the master forwarding link $a_1$ of the head node A, the standby forwarding link $a_2$ of the head node A, the master node B, the standby node C and the master forwarding link $b_1$, standby forwarding link $b_2$ and protection link $b_3$ of the master node B; and when the master forwarding link $b_1$ of the master node B fails, the master node B sends the data packet received from the head node A to the standby node C through the protection link $b_3$ to enable the standby node C to forward the data packet through the standby forwarding link $b_2$.

It is to be noted that the device for controlling self-loopback of network data in the embodiment of the present disclosure may be software codes executed by a processor in the master node or in another node or in a new dedicated node, or may also be a new hardware device added to the node or a combination of the hardware device and the software codes, which is not limited in the embodiment of the present disclosure and may be regulated by those skilled in the art according to a practical requirement.

When the master forwarding link of the master node fails, the processing module 30 controls the master node to send the received data packet to the standby node through the protection link to enable the standby node to forward the data packet through the standby forwarding link, so that the received data packet may be forwarded even when the master forwarding link of the master node fails, and network reliability is improved.

The analysis module 10 and the processing module 30 may be implemented by a Central Processing Unit (CPU), Micro Processing Unit (MPU), a Digital Signal Processor (DSP) or a Field Programmable Gate Array (FPGA) in the device for controlling self-loopback of network data in the embodiment of the present disclosure; and the data receiving and sending module 20 may be implemented by a communication functional chip in the device for controlling self-loopback of network data in the embodiment of the present disclosure.

An embodiment of the present disclosure further provides a computer-readable storage medium, which includes a set of computer-executable instructions, the instructions being configured to execute the method for controlling self-loopback of network data in the embodiment of the present disclosure.

Those skilled in the art should know that the embodiments of the present disclosure may be provided as a method, a system or a computer program product. Therefore, the present disclosure may adopt a hardware embodiment, a software embodiment and combined software and hardware embodiment. Moreover, the present disclosure may adopt a computer program product implemented on one or more computer-available storage media (including, but not limited to, a disk memory, an optical memory and the like) including computer-available program codes.

The present disclosure is described with reference to flowcharts and/or block diagrams of the method, equipment (system) and computer program product according to the embodiments of the present disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or other programmable data processing equipment, so that a series of operating steps are executed in the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above is only the preferred implementation modes of the present disclosure and thus not intended to limit the scope of the present disclosure, and all equivalent structure or equivalent flow transformations made out of contents of the specification and drawings of the present disclosure or direct or indirect application of the contents to the other related arts shall fall within the scope of protection of the present disclosure.

What is claimed is:

1. A method for controlling self-loopback of network data, comprising:
    determining whether a master forwarding link and a standby forwarding link of a master node in a network structure both fail or not; and
    when the master forwarding link and the standby forwarding link of the master node both fail, modifying a forwarding attribute of a standby egress port in a data packet forwarding table of the master node into forwarding through the master forwarding link of the master node.

2. The method for controlling self-loopback of network data according to claim 1, further comprising: after the step of modifying the forwarding attribute of the standby egress port in the data packet forwarding table of the master node into forwarding through the master forwarding link of the master node,
    determining whether a standby node receives a data packet from the master node or not; and
    when the standby node receives the data packet from the master node, modifying the data packet forwarding table of the master node to ensure that the forwarding attribute of the standby egress port in the data packet forwarding table of the master node is modified into forwarding through the master forwarding link of the master node.

3. The method for controlling self-loopback of network data according to claim 1, further comprising:
    acquiring information of the master node of which the master forwarding link and standby forwarding link both fail, and determining within a preset time whether communication of the standby forwarding link of the acquired master node is resumed or not; and
    when communication of the standby forwarding link of the acquired master node is resumed, modifying the forwarding attribute of the standby egress port in the data packet forwarding table back into forwarding through the standby forwarding link.

4. The method for controlling self-loopback of network data according to claim 1, further comprising: after the step of determining whether the master forwarding link and standby forwarding link of the master node in the network structure both fail or not,
    when the master forwarding link of the master node fails and the standby forwarding link of the master node does not fail, controlling the master node to send a received data packet to a corresponding standby node through a preset protection link to enable the corresponding standby node to forward the received data packet.

5. The method for controlling self-loopback of network data according to claim 1, wherein the step of determining whether the master forwarding link and standby forwarding link of the master node both fail or not further comprises:
    detecting and receiving failure information from the master forwarding link and/or the standby forwarding link of the master node, and when the failure information sent by the master forwarding link and the standby forwarding link of the master node is received within a preset time, determining that the master forwarding link and the standby forwarding link of the master node both fail.

6. A device for controlling self-loopback of network data, comprising:
    an analysis module, configured to determine whether a master forwarding link and a standby forwarding link of a master node in a network structure both fail or not; and
    a processing module, configured to, when the master forwarding link and the standby forwarding link of the master node both fail, modify a forwarding attribute of a standby egress port in a data packet forwarding table of the master node into forwarding through the master forwarding link of the master node.

7. The device for controlling self-loopback of network data according to claim 6, wherein
    the analysis module is further configured to determine whether a standby node receives a data packet from the master node or not; and
    the processing module is further configured to, when the standby node receives the data packet from the master node, modify the data packet forwarding table of the master node to ensure that the forwarding attribute of the standby egress port in the data packet forwarding table of the master node is modified into forwarding through the master forwarding link of the master node.

8. The device for controlling self-loopback of network data according to claim 6, wherein
    the processing module is further configured to acquire information of the master node of which the master forwarding link and the standby forwarding link both fail;
    the analysis module is further configured to determine within a preset time whether communication of the standby forwarding link of the acquired master node is resumed or not; and
    the processing module is further configured to, when communication of the standby forwarding link of the acquired master node is resumed, modify the forwarding attribute of the standby egress port in the data packet forwarding table back into forwarding through the standby forwarding link.

9. The device for controlling self-loopback of network data according to claim 6, wherein
the processing module is further configured to, when the master forwarding link of the master node fails and the standby forwarding link of the master node does not fail, control the master node to send a received data packet to a corresponding standby node through a preset protection link to enable the corresponding standby node to forward the received data packet.

10. The device for controlling self-loopback of network data according to claim 6, further comprising a data receiving and sending module, wherein
the data receiving and sending module is configured to detect and receive failure information from the master forwarding link and/or the standby forwarding link of the master node; and
the analysis module is further configured to, when the failure information sent by the master forwarding link and the standby forwarding link of the master node is received within a preset time, determine that the master forwarding link and the standby forwarding link of the master node both fail.

11. A non-transitory computer-readable storage medium, comprising a set of computer-executable instructions, the instructions being configured to execute a method for controlling self-loopback of network data, wherein the method comprises:
determining whether a master forwarding link and a standby forwarding link of a master node in a network structure both fail or not; and
when the master forwarding link and the standby forwarding link of the master node both fail, modifying a forwarding attribute of a standby egress port in a data packet forwarding table of the master node into forwarding through the master forwarding link of the master node.

12. The method for controlling self-loopback of network data according to claim 2, further comprising:
acquiring information of the master node of which the master forwarding link and standby forwarding link both fail, and determining within a preset time whether communication of the standby forwarding link of the acquired master node is resumed or not; and
when communication of the standby forwarding link of the acquired master node is resumed, modifying the forwarding attribute of the standby egress port in the data packet forwarding table back into forwarding through the standby forwarding link.

13. The device for controlling self-loopback of network data according to claim 7, wherein
the processing module is further configured to acquire information of the master node of which the master forwarding link and the standby forwarding link both fail;
the analysis module is further configured to determine within a preset time whether communication of the standby forwarding link of the acquired master node is resumed or not; and
the processing module is further configured to, when communication of the standby forwarding link of the acquired master node is resumed, modify the forwarding attribute of the standby egress port in the data packet forwarding table back into forwarding through the standby forwarding link.

14. The non-transitory computer-readable storage medium according to claim 11, wherein the instructions are configured to execute the method further comprising:
determining whether a standby node receives a data packet from the master node or not; and
when the standby node receives the data packet from the master node, modifying the data packet forwarding table of the master node to ensure that the forwarding attribute of the standby egress port in the data packet forwarding table of the master node is modified into forwarding through the master forwarding link of the master node.

15. The non-transitory computer-readable storage medium according to claim 11, wherein the instructions are configured to execute the method further comprising:
acquiring information of the master node of which the master forwarding link and standby forwarding link both fail, and determining within a preset time whether communication of the standby forwarding link of the acquired master node is resumed or not; and
when communication of the standby forwarding link of the acquired master node is resumed, modifying the forwarding attribute of the standby egress port in the data packet forwarding table back into forwarding through the standby forwarding link.

16. The non-transitory computer-readable storage medium according to claim 14, wherein the instructions are configured to execute the method further comprising:
acquiring information of the master node of which the master forwarding link and standby forwarding link both fail, and determining within a preset time whether communication of the standby forwarding link of the acquired master node is resumed or not; and
when communication of the standby forwarding link of the acquired master node is resumed, modifying the forwarding attribute of the standby egress port in the data packet forwarding table back into forwarding through the standby forwarding link.

17. The non-transitory computer-readable storage medium according to claim 11, wherein the instructions are configured to execute the method further comprising:
when the master forwarding link of the master node fails and the standby forwarding link of the master node does not fail, controlling the master node to send a received data packet to a corresponding standby node through a preset protection link to enable the corresponding standby node to forward the received data packet.

18. The non-transitory computer-readable storage medium according to claim 11, wherein the step of determining whether the master forwarding link and standby forwarding link of the master node both fail or not further comprises:
detecting and receiving failure information from the master forwarding link and/or the standby forwarding link of the master node, and when the failure information sent by the master forwarding link and the standby forwarding link of the master node is received within a preset time, determining that the master forwarding link and the standby forwarding link of the master node both fail.

* * * * *